US006199142B1

(12) United States Patent
Saulsbury et al.

(10) Patent No.: US 6,199,142 B1
(45) Date of Patent: *Mar. 6, 2001

(54) PROCESSOR/MEMORY DEVICE WITH INTEGRATED CPU, MAIN MEMORY, AND FULL WIDTH CACHE AND ASSOCIATED METHOD

(75) Inventors: Ashley Saulsbury, Menlo Park; Andreas Nowatzyk; Fong Pong, both of Mountain View, all of CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/675,254

(22) Filed: Jul. 1, 1996
(Under 37 CFR 1.47)

(51) Int. Cl.[7] .................................................. G06F 13/00
(52) U.S. Cl. ............................ 711/118; 711/5; 711/105; 711/123; 711/133; 711/144; 711/168
(58) Field of Search .................................... 711/122, 126, 711/127, 123, 125, 143, 144, 145, 5, 168, 133, 105, 118

(56) References Cited

U.S. PATENT DOCUMENTS

| | | | |
|---|---|---|---|
| 4,577,293 | * 3/1986 | Matick et al. | 365/189.04 |
| 4,899,275 | * 2/1990 | Sachs et al. | 711/3 |
| 5,184,320 | 2/1993 | Dye | 365/49 |
| 5,345,576 | * 9/1994 | Lee et al. | 710/128 |
| 5,353,429 | * 10/1994 | Fitch | 711/118 |
| 5,510,934 | * 4/1996 | Brennan et al. | 711/119 |

(List continued on next page.)

OTHER PUBLICATIONS

Iwata, S. et al., "Performance Evaluation of a Microprocessor with On–chip DRAM and High Bandwidth Internal Bus" *IEEE 1996 Custom Integrated Circuits Conference*, pp. 269–272 (1996).

ADSP–21060 SHARC Microcomputer Family, *Super Harvard Architecture Computer*, Analog Devices, Norwood, MA, Oct. 1993.

Wulf, William A., et al., "Hitting the Memory Wall: Implications of the Obvious", *ACM Computer Architecture News*, vol. 23 (1):pp.20–24, Mar. 1995.

Nowatzyk, A., et al., "The S3.mp Scalable Shared Memory Multiprocessor", *Proc. of the 24th Int'l. Conference on Parallel Processing*, 1995.

Nowatzyk, A., et al., "S–Connect: from Networks of Workstations to Supercomputer Performance", *Proc. Of the 22nd Int'l. Symp. On Computer Architecture*, Jun. 1994.

(List continued on next page.)

*Primary Examiner*—Do Hyun Yoo
*Assistant Examiner*—Hong Kim
(74) *Attorney, Agent, or Firm*—Flehr Hohbach Test Albritton & Herbert LLP

(57) ABSTRACT

An integrated processor/memory device comprising a main memory, a CPU, and a full width cache. The main memory comprises main memory banks. Each of the main memory banks stores rows of words. The rows are a predetermined number of words wide. The cache comprises cache banks. Each of the cache banks stores one or more cache lines of words. Each of the cache lines has a corresponding row in the corresponding main memory bank. The cache lines are the predetermined number of words wide. When the CPU issues an address in the address space of the corresponding main memory bank, the cache bank determines from the address and the tags of the cache lines whether a cache bank hit or a cache miss has occurred in the cache bank. When a cache bank miss occurs, the cache bank replaces a victim cache line of the cache lines with a new cache line that comprises the corresponding row of the corresponding memory bank specified by the issued address.

14 Claims, 9 Drawing Sheets

U.S. PATENT DOCUMENTS

| | | | |
|---|---|---|---|
| 5,581,725 | * | 12/1996 | Nakayama ............................ 711/122 |
| 5,649,154 | * | 7/1997 | Kumar et al. ........................ 711/122 |
| 5,848,004 | * | 12/1998 | Dosaka et al. .................. 365/230.03 |

OTHER PUBLICATIONS

Nowatzyk, A., et al. "Exploting Parallelism in Cache Coherency Protocol Engines", *Europar 1995*, Stockholm, Sweden.

Jouppi, Norman P., "Improving Direct–Mapped Cache Performance by the Addition of a Small Fully–Associative Cache and Prefetch Buffers", *Proceedings of the 17th Annual Int'l. Sympo. On Computer Architecture*, pp. 364–373, 1990.

Fillo, M., et al. "The M–Machine Multicomputer", *Artificial Intelligence Lab MIT*, Cambridge, MA, Mar. 1995.

Kogge, P.M., et al. "Execube——A New Architecture for Scaleable MPPs", *Int'l. Conference on Parallel Processing*, 1994.

T. Shimizu, et al., "A Multimedia 32b RISC Microprocessor with 16Mb DRAM", *IEEE*, 216–217 & 448 (1996).

Aimoto, Y., et al., "A 7.68GIPS 3.84 GB/s 1W Parallel Image–Processing RAM Integrating a 16Mb DRAM and 128 Processors", *IEEE*, 372–373 (1996).

"The IMS T800 Transputer", *IEEE Micro*, 10–26:vol. 7(5) (Oct. 1987).

"Mitsubishi Debuts Industry's First Microprocessor with On–Chip DRAM", Mitsubishi Electronics America, INc., Mar. 12, 1996.*

Jim Handy, "The Cache Memory book," Academic Press, pp. 37–107 and 120–125, 1993.*

* cited by examiner

PROCESSOR/MEMORY DEVICE WITH INTEGRATED CPU, MAIN MEMORY, AND FULL WIDTH CACHE AND ASSOCIATED METHOD

The present invention relates generally to integrated processor/memory (P/M) devices with an on-chip cache and an on-chip main memory. In particular, it pertains to a P/M device with an on-chip cache that is as wide as the on-chip main memory (i.e., is full width).

BACKGROUND OF THE INVENTION

Traditionally, the development of processor and memory devices has proceeded independently. Advances in process technology, circuit design, and integrated chip (IC) architecture have led to a near exponential increase in processor speed and memory capacity. However, memory device latencies have not improved as dramatically and access times are increasingly becoming the limiter of processor performance. This is a problem known as the Memory Wall and is more fully described in *Hitting the Memory Wall: Implication of the Obvious,* by William A. Wulf and Sally A. McKee, ACM Computer Architecture News, Vol. 23, No. 1, March 1995, which is hereby explicitly incorporated by reference.

Current high performance processors, which use complex superscalar central processing units (CPUs) that interface to external off-chip main memory through a hierarchy of caches, are particularly affected by the Memory Wall problem. In fact, this CPU-centric design approach requires a large amount of power and chip area to bridge the gap between CPU and memory speeds.

The Memory Wall problem is commonly addressed by adding several levels of cache to the memory system so that small, high speed, static random access memory (SRAM) devices feed the CPU at low latencies. Combined with latency hiding techniques, such as prefetching and proper code scheduling, it is possible to run a high performance processor at reasonable efficiencies for applications with enough locality for the caches. However, while achieving impressive performance on applications that fit nicely into their caches, these processors have become increasingly application sensitive. For example, large applications such as CAD programs, data base applications, or scientific applications often fail to meet CPU based speed expectations by a wide margin.

Moreover, the CPU-centric design approach has lead to very complex superscalar processors with deep pipelines. Much of this complexity, such as out-of-order execution and register scoreboarding, is devoted to hiding memory system latency. In addition, these processors demand a large amount of support logic in terms of caches, controllers and data paths to talk to the external main memory. This adds considerable cost, power dissipation, and design complexity.

To fully utilize a superscalar processor, a large memory system is required. The effect of this is to create a bottleneck that increases the distance between the CPU and main memory. Specifically, it adds interfaces and chip boundaries which reduce the available memory bandwidth due to packaging and connection constraints.

However, integrating the processor with the memory device avoids most of the problems of the CPU-centric design approach. And, doing so offers a number of advantages that effectively compensate for the technological limitations of a single chip design.

Specifically, in CPU-centric processor designs, the instruction and data cache lines have a width that is significantly less than the width of the main memory. This is primarily due to the fact that the time to fill these cache lines from the off-chip main memory would introduce severe second order contention effects at the memory interface of the processor. As a result, such less than full width caches are unable to take advantage of the often high spatial locality of instruction and data streams.

Thus, there is a need for full width instruction and data caches that take advantage of the high spatial locality of instruction and data streams in many applications. Moreover, the corresponding U.S. Pat. No. 5,900,011, issued May 4, 1999, and hereby explicitly incorporated by reference, describes and claims the use of a victim data cache to further improve the miss rate of such a full width data cache.

SUMMARY OF THE INVENTION

In summary, the present invention is an integrated processor/memory device. It comprises a main memory, a CPU, and a full width cache.

The main memory has a predefined address space and comprises main memory banks. Each of the main memory banks occupies a corresponding portion of the address space and stores rows of words at memory locations with addresses in the corresponding portion of the address space. The rows are a predetermined number of words wide.

The cache comprises cache banks. Each of the cache banks is coupled to a corresponding main memory bank of the main memory banks and the CPU. Each of the cache banks comprises a cache bank line storage, a cache bank tag storage, and cache bank logic. The cache bank line storage is coupled to the corresponding main memory bank and stores one or more cache lines of words. Each of the cache lines has a corresponding row in the corresponding main memory bank. The cache lines are the predetermined number of words wide. The cache bank tag storage stores a corresponding tag for each of the cache lines. Each of the tags identifies the row in the corresponding memory bank of the corresponding cache line. The cache bank logic is coupled to the CPU, the corresponding memory bank, and the cache storage. When the CPU issues an address in the address space of the corresponding main memory bank, the cache bank logic determines from the address and the tags of the cache lines whether a cache bank hit or a cache miss has occurred in the cache bank line storage. When a cache bank miss occurs, the cache bank logic replaces a victim cache line of the cache lines with a new cache line that comprises the corresponding row of the corresponding memory bank specified by the issued address.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF THE INVENTION

Figure 1:
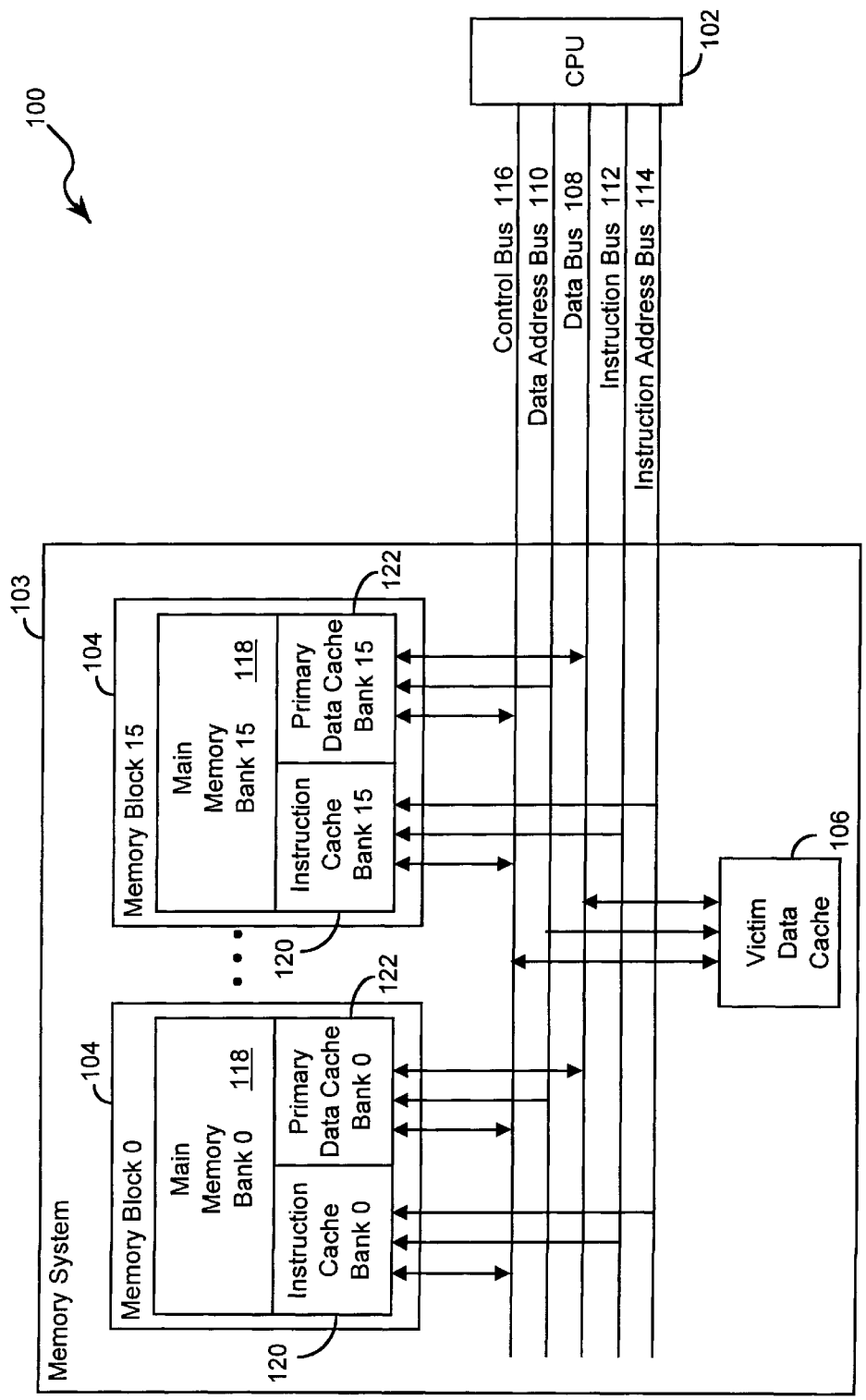
FIG. 1 is a block diagram of an integrated processor/memory (P/M) device in accordance with the present invention.

Referring to FIG. 1, there is shown an exemplary embodiment of an integrated P/M device 100 in accordance with the present invention. The integrated components of the P/M device include a CPU 102, an on-chip memory system 103, a 64 bit data bus 108, a 25 bit data address bus 110, a 32 bit instruction bus 112, a 25 bit instruction address bus 114, and a control bus 116. The memory system includes 16 memory blocks 104 and a victim cache 106.

Each memory block 104 includes a corresponding main memory bank 118, a corresponding instruction cache bank 120, and a corresponding data cache bank 122. As will be evident from the following discussion, the 16 main memory banks together form the main memory of the P/M device. And, the 16 instruction cache banks together form a direct-mapped instruction cache while the 16 data cache banks together form a two-way set-associative data cache. In addition, the victim cache is a 16-way fully-associative cache.

Main Memory

Figure 2:
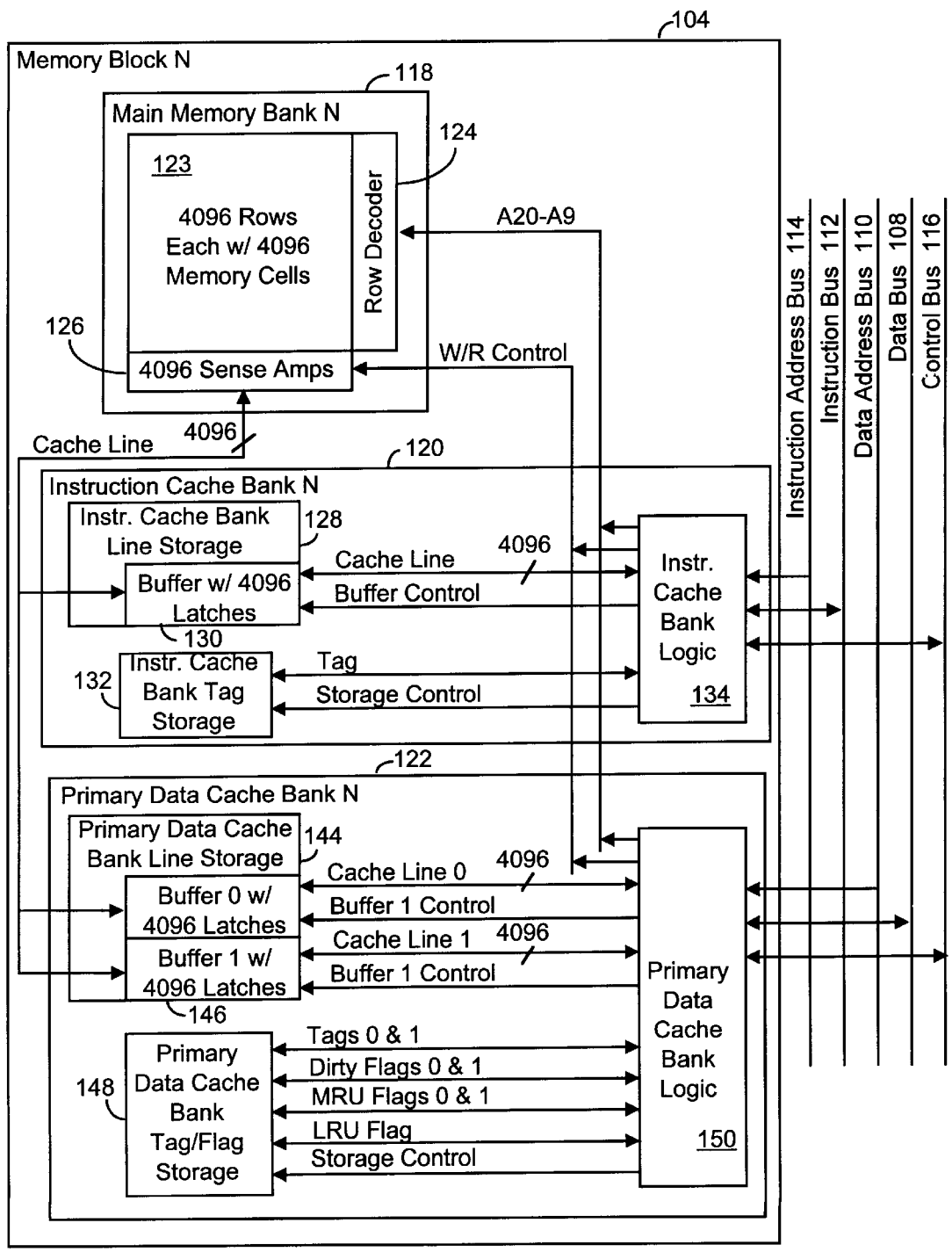
FIG. 2 is a block diagram of the main memory bank, the primary data cache bank, and instruction cache bank of each memory block of the P/M device.

Referring to FIG. 2, the main memory bank 118 of each memory block 104 comprises a 16M bit DRAM that has 4096 (4K) rows of memory cells 123. Each row has 4096 memory cells. The main memory bank also includes a row decoder 124 that decodes 12 address bits to locate the row addressed (i.e., identified) by the 12 address bits. And, the main memory bank includes 4096 sense amplifiers 126 that collectively read or write an addressed row of 4096 bits at a time to or from the memory cells of the addressed row. Since in the exemplary embodiment the main memory bank comprises a DRAM, access time to the main memory bank is 6 cycles (e.g., 30 ns).

Since the rows of each main memory bank 118 are 4096 bits or 512 bytes wide, each main memory bank contains 2M bytes and the 16 main memory banks together form a main memory that contains 32M bytes. Thus, each main memory bank occupies a 2M byte portion of the 32M byte main memory address space. Moreover, each byte is addressable with a 25 bit address A24–A0 where the 4 most significant address bits A24–A21 identify the main memory bank, the next 12 address bits A20–A9 identify the row of the main memory bank, and the 9 least significant address bits A0–A8 identify the byte in the row.

Instruction Cache

Still referring to FIG. 2, the instruction cache bank 120 of each memory block 104 includes an instruction cache bank line storage 128. The instruction cache bank line storage comprises a single long buffer 130 with 4096 latches. The latches of the buffer collectively store a single long instruction cache line (or block) that, like each row of the main memory bank 118 of the memory block, is 4096 bits or 512 bytes wide. And, since the instruction cache line is as wide as each row of the main memory bank, it is considered full-width. In the exemplary embodiment, each instruction word is 32 bits or 4 bytes long. As a result, the instruction cache line is 128 instruction words wide and so is each row of the main memory bank that stores instruction words.

Moreover, in each memory block 104, each row of the main memory bank 118 is indexed (i.e., mapped) to the single instruction cache line of the instruction cache bank line storage 128. Thus, all 25 bit instruction addresses A24–A0 that specify a row in the main memory bank will include the same index to the instruction cache bank line storage. This index is the 4 most significant bits A24–A21 of these addresses and also identifies the main memory bank.

The instruction cache bank 120 of each memory block 104 also includes an instruction cache bank tag storage 132. The instruction cache bank tag storage stores a 12 bit instruction cache line tag that identifies the row in the corresponding main memory bank 118 normally occupied by the instruction cache line currently stored (i.e., cached) by the instruction cache bank line storage 128. This tag, as will be explained shortly, is compared by the instruction cache bank logic 134 with the 12 address bits A20–A9 of each 25 bit instruction address A24–A0 that is issued and is in the corresponding main memory bank's portion of the main memory address space.

Figure 3:
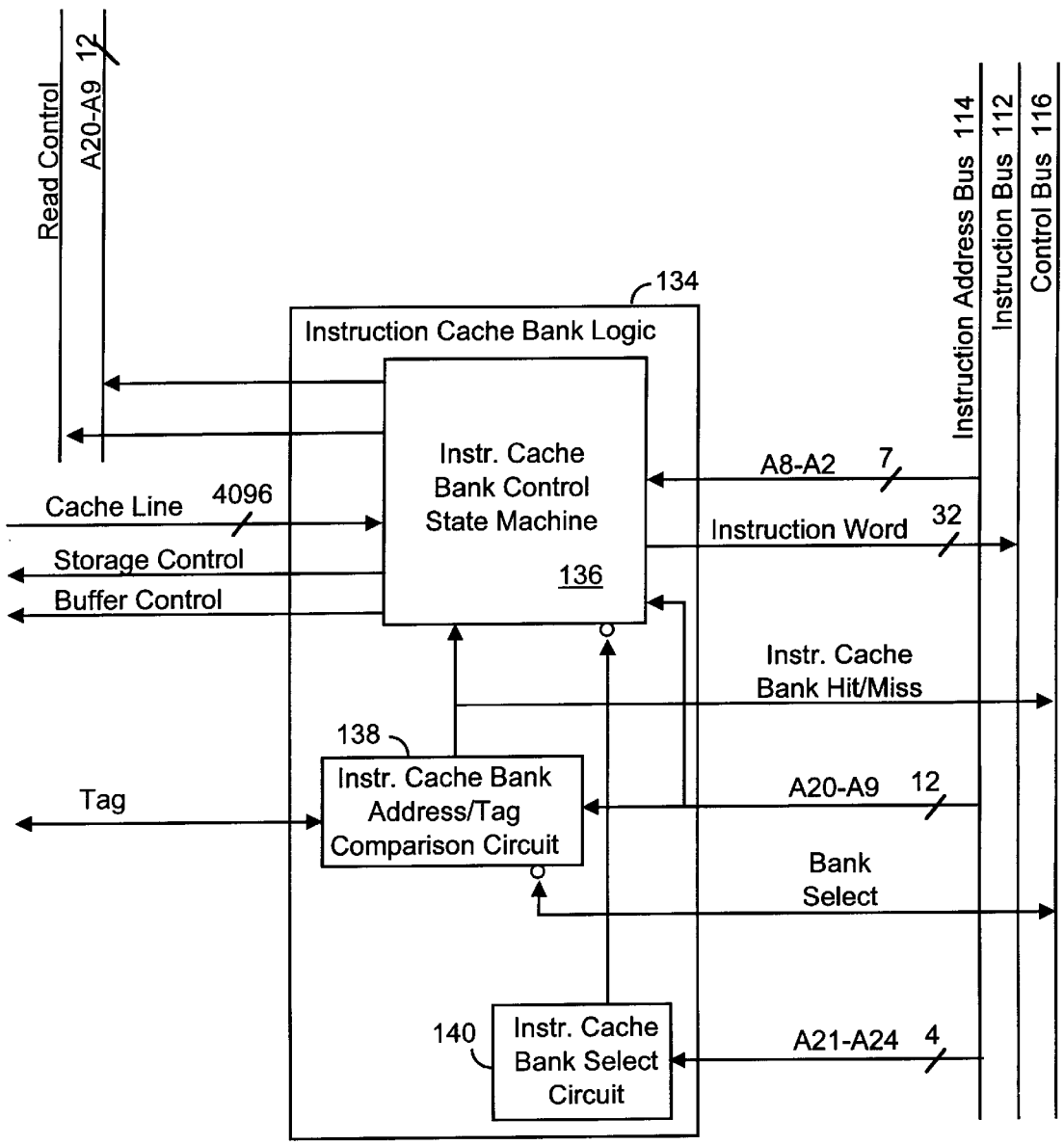
FIG. 3 is a block diagram of the instruction cache bank logic of each instruction cache bank.
Figure 4:
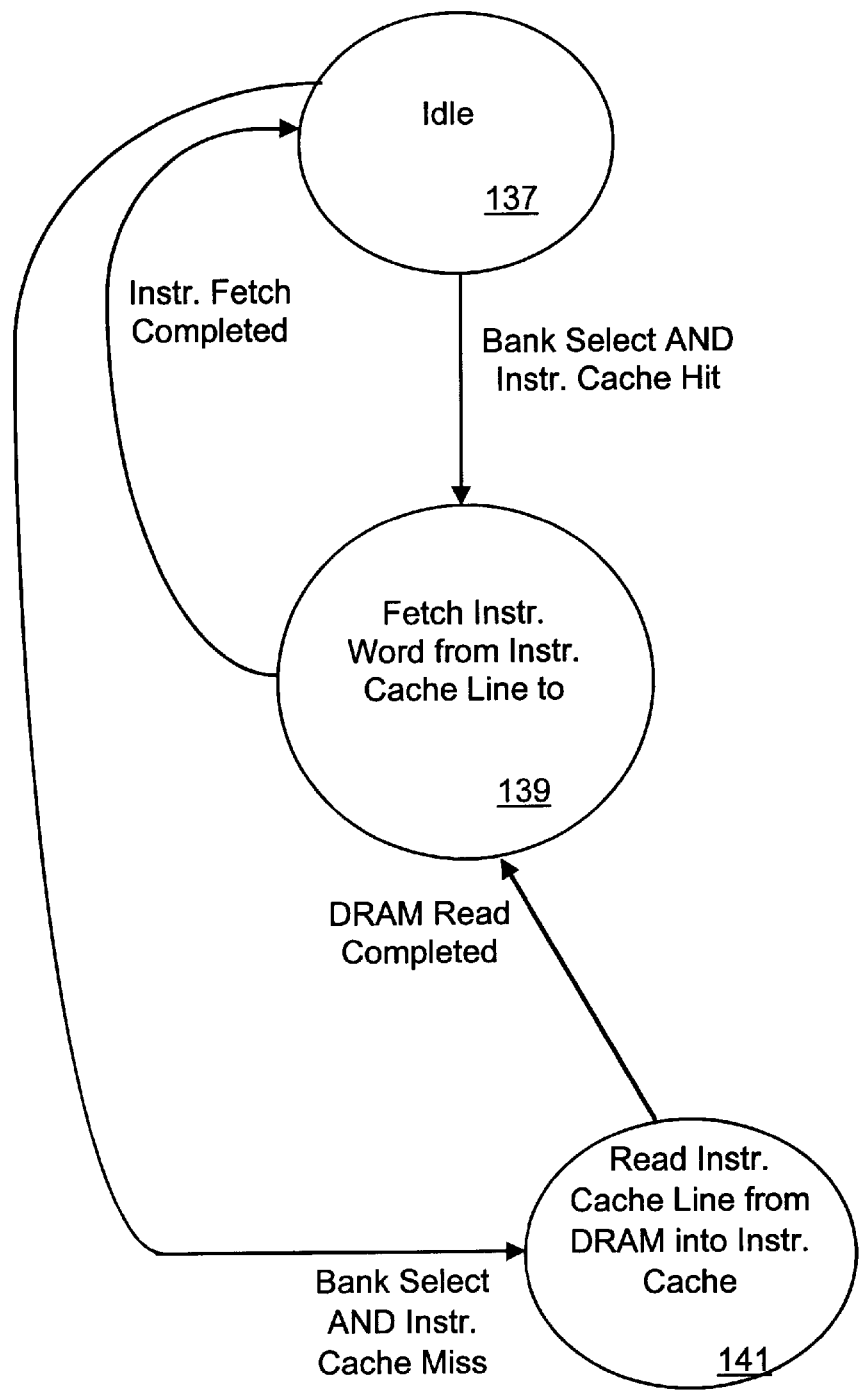
FIG. 4 is a state diagram of the states of the instruction cache bank logic of each instruction cache bank.

The operation of the instruction cache bank 120 of each memory block 104 is controlled by the instruction cache bank logic 134. Turning now to FIG. 3, the instruction cache bank logic of each instruction cache bank includes an instruction cache bank control state machine 136, an instruction cache bank address/tag comparison circuit 138, and an instruction cache bank select circuit 140. FIG. 4 shows the states of operation of the instruction cache bank logic control state machine.

Referring to FIGS. 2–4, when the CPU wishes to fetch a new instruction word for the instruction pipeline of the CPU, it issues a 25 bit instruction address A24–A0 on the instruction address bus 114 for fetching the instruction word. The issued instruction address specifies the memory location of the instruction word in the address space of the main memory.

In each instruction cache bank 120, the instruction cache bank select circuit 140 of the instruction cache bank logic 134 receives the 4 most significant bits A24–A21 of the issued instruction address from the instruction address bus 114. In response, it decodes these 4 address bits to determine whether they identify the corresponding main memory bank 118 (i.e., wether the issued address is in the corresponding main memory's portion of the main memory address space). If they do identify the corresponding main memory bank, then the instruction cache bank select circuit sends a bank select signal to the instruction cache bank control state machine 136 and the instruction cache bank address/tag comparison circuit 138 indicating that the corresponding main memory bank has been selected. Otherwise, the bank select signal indicates that the corresponding main memory bank has not been selected and the instruction cache bank control state machine remains in an idle state (state 137 of FIG. 4).

In each instruction cache bank 120, when the bank select signal indicates that the corresponding main memory bank 118 has been selected, then the instruction cache bank address/tag comparison circuit 138 compares the instruction cache line tag currently stored in the instruction cache bank tag storage 132 with the 12 address bits A20–A9 of the issued instruction address on the instruction address bus 114. As alluded to earlier, these 12 address bits identify the memory location of the row in the corresponding main memory bank where the instruction word is stored.

If there is a match, then the instruction cache bank address/tag comparison circuit 138 issues an instruction cache bank hit/miss signal that together with the bank select signal indicates that an instruction cache bank hit has occurred. This means that the memory location specified by the issued instruction address is currently accessible at the instruction cache line currently stored by the instruction cache bank line storage 128.

The instruction cache bank hit/miss signal and the bank select signal from each instruction cache bank 120 are provided to the CPU 102 via the control bus 116. When the instruction cache bank hit/miss and bank select signals from an instruction cache bank indicate that an instruction cache bank hit has occurred in the instruction cache bank, this lets the CPU know that the instruction word will be fetched directly from the instruction cache bank 120. As a result, the CPU does not need to stall the instruction pipeline in order to wait for the instruction to be read from the main memory bank into the instruction cache bank and then be fetched, as would have been the case had an instruction cache bank miss occurred.

In each instruction cache bank 120, the instruction cache bank hit/miss signal is also provided to the instruction cache bank control state machine 136. The instruction cache bank control state machine additionally receives from the instruction address bus 114 the 7 address bits A8–A2 of the issued instruction address and the instruction cache line currently stored by the instruction cache bank line storage 128.

When the instruction cache bank hit/miss and bank select signals from an instruction cache bank 120 indicate that an instruction cache bank hit has occurred in the instruction cache bank, the instruction cache bank control state machine 136 of the instruction cache bank leaves its idle state (state 137 of FIG. 4) and decodes the received 7 address bits to determine the accessible memory location in the instruction cache line specified by the issued instruction address. It then fetches the instruction word from this location and provides it to the CPU 102 (state 139 of FIG. 4). This is done by routing (i.e., multiplexing) the instruction word onto the instruction bus 112 so that it is received by the CPU 102. As a result, the fetch of the instruction word is completed. In the exemplary embodiment, this is done in a single cycle (e.g., 5 ns).

However, in each instruction cache bank 120, when the instruction cache bank address/tag comparison circuit 138 determines that there is no match between the compared instruction cache line tag and the 12 address bits A20–A9 of the issued instruction address, then it issues an instruction cache bank hit/miss signal that together with the bank select signal indicates that an instruction cache bank miss has occurred. This means that the location specified by the issued instruction address is not currently accessible at the instruction cache line currently stored by the instruction cache bank line storage 128.

Thus, when the instruction cache bank hit/miss and bank select signals received by the CPU 102 from an instruction cache bank 120 indicate that an instruction cache bank miss has occurred, it stalls so that a new instruction cache line at the memory location specified by the issued instruction address can be read by the instruction cache bank control state machine from the corresponding main memory bank 118 into the instruction cache bank (state 141 of FIG. 4). In this case, when the instruction cache bank control state machine 136 receives this instruction cache bank hit/miss and bank select signals, it issues to the main memory bank 118 a W/R control signal indicating that a read is to occur and the 12 address bits A20–A9 received from the instruction address bus 114. In response to the 12 address bits, the row decoder locates the row of the main memory bank identified by the 12 address bits. And, in response to the W/R control signal, the sense amplifiers 126 read out this row as the new instruction cache line. While this is occurring, the instruction cache bank control state machine 136 issues buffer control signals to the buffer 130 of the instruction cache bank line storage 128. In response, the buffer latches the new instruction cache line received from the sense amplifiers 126 and in doing so replaces the previous instruction cache line that was latched by the buffer. In the exemplary embodiment this requires 6 cycles to perform including 1 cycle to determine that an instruction cache bank miss occurred, 4 cycles of pre-charging the sense amplifiers and address bit decoding by the row decoder, and 1 cycle to latch into the buffer the new instruction cache line read out by the sense amplifiers.

In each instruction cache bank, once a new instruction cache line has been stored in the instruction cache bank line storage 128, the instruction cache bank control state machine 136 decodes the 7 address bits A8–A2 of the issued instruction address to locate the instruction word in the new instruction cache line. It then fetches the located instruction word from the instruction cache line and routes it to the CPU 102 in the manner described earlier (state 139 of FIG. 4). As indicated previously, in the exemplary embodiment, this is done in a single cycle. After this is accomplished, it returns to an idle state (state 137 of FIG. 4) and waits for the next issued instruction address.

In view of the foregoing, it is clear that the 16 instruction cache banks 120 together form a direct-mapped on-chip instruction cache memory that contains 8K bytes. Since the instruction cache line stored by each instruction cache bank is full-width, the cache miss rate is greatly reduced over conventional processors with instruction cache lines that are less than full-width. This low cache miss rate is due to the prefetching effect of the long instruction cache line and the usually high spatial locality found in instruction streams.

Moreover, conventional processors with off-chip main memory and on-chip instruction caches are unable to reap the benefit of a full-width instruction cache line. This is due to the severe second order contention effects that would be introduced at the memory interface in reading such a full-width cache line from the main memory to the instruction cache. However, in the present invention, these contention effects are eliminated because both the instruction cache and main memory banks 118 and 120 are on-chip. Thus, in the exemplary embodiment, an entire full-width instruction cache line can be read in a single cycle from a main memory bank into the corresponding instruction cache bank in 6 cycles.

Data Cache and Victim Data Cache

Referring again to FIG. 2, the primary data cache bank 122 of each memory block 104 includes a primary data cache bank line storage 144 that comprises two buffers 146. Like the buffer 130 of each instruction cache bank line storage 128, each buffer of the primary data cache bank line storage includes 4096 latches that together store a primary data cache line that is 4096 bits or 512 bytes wide. Moreover, in the exemplary embodiment, each primary data cache line is 64 data words wide with each data word being 64 bits or 8 bytes long.

In each memory block 104, each row of the main memory bank 118 is indexed to both of the primary data cache lines of the primary data cache bank line storage 144, as well as being indexed to the instruction cache line of the instruction cache bank line storage 128. Thus, all 25 bit data addresses A24–A0 that specify a row in the main memory bank will include the same index to the primary data cache bank line storage. Similar to the instruction addresses, this index is the 4 most significant bits A24–A21 of the data addresses and also identifies the main memory bank.

The primary data cache bank 122 of each memory block 104 also includes a primary data cache bank tag/flag storage 148. The primary data cache bank tag/flag storage stores a corresponding 12 bit primary data cache line tag and a corresponding dirty flag for each of the two primary data cache lines currently stored by the primary data cache bank line storage 144. Each tag identifies the row in the corresponding main memory bank 118 normally occupied by the corresponding primary data cache line. These tags are compared by the primary data cache bank logic 150 with the 12 address bits A20–A9 of each 25 bit data address A24–A0 that is issued and is in the corresponding main memory bank's portion of the main memory address space. Each dirty flag identifies whether the corresponding primary data cache line is dirty (i.e., contains one or more data words that have been written into the primary data cache line but not yet to the main memory bank). Additionally, the primary data cache bank tag/flag storage stores a least recently used flag (LRU) flag that identifies which of the primary data cache lines was least recently used (i.e., accessed).

Figure 5:
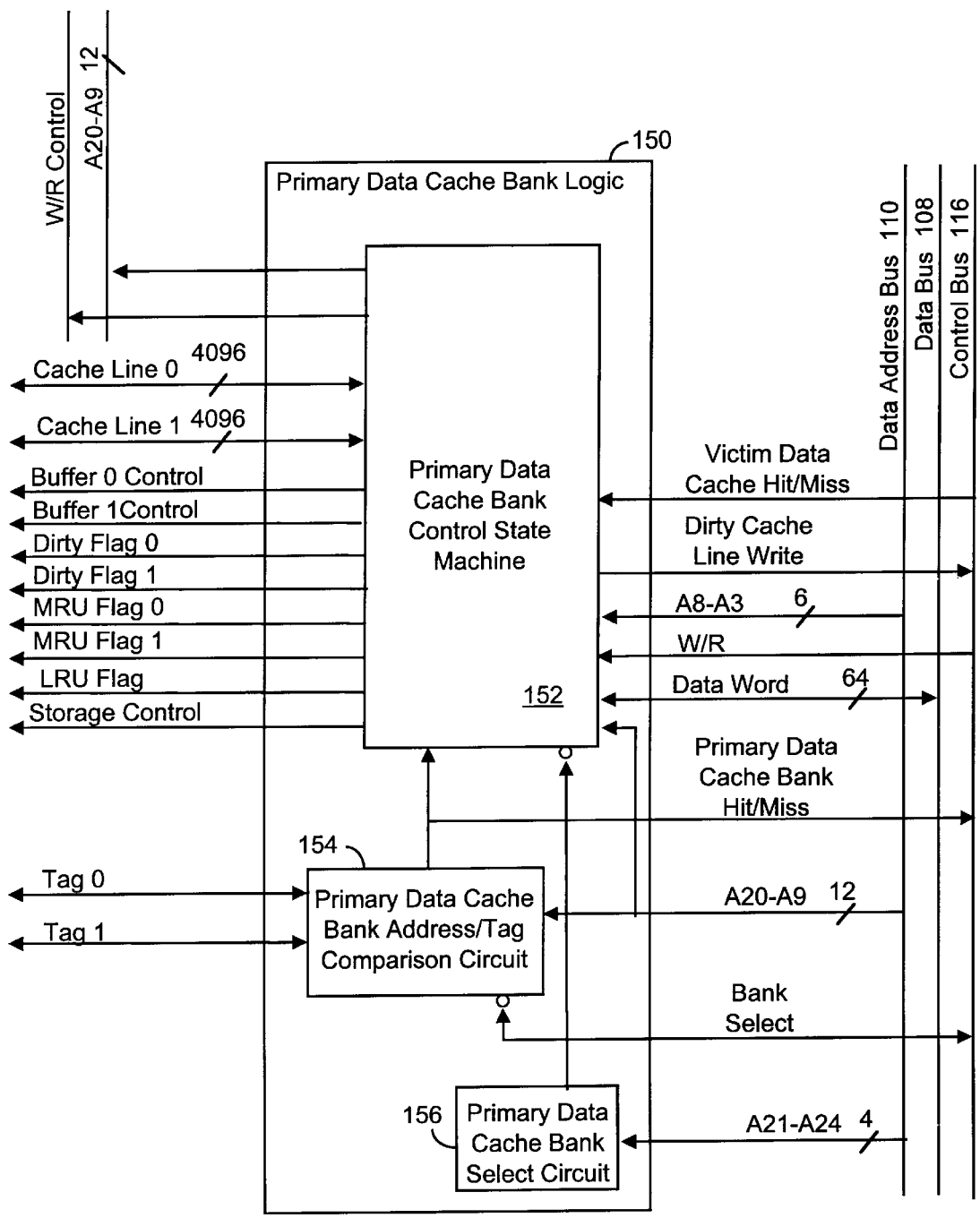
FIG. 5 is a block diagram of the primary data cache bank logic of each primary data cache bank.
Figure 6:
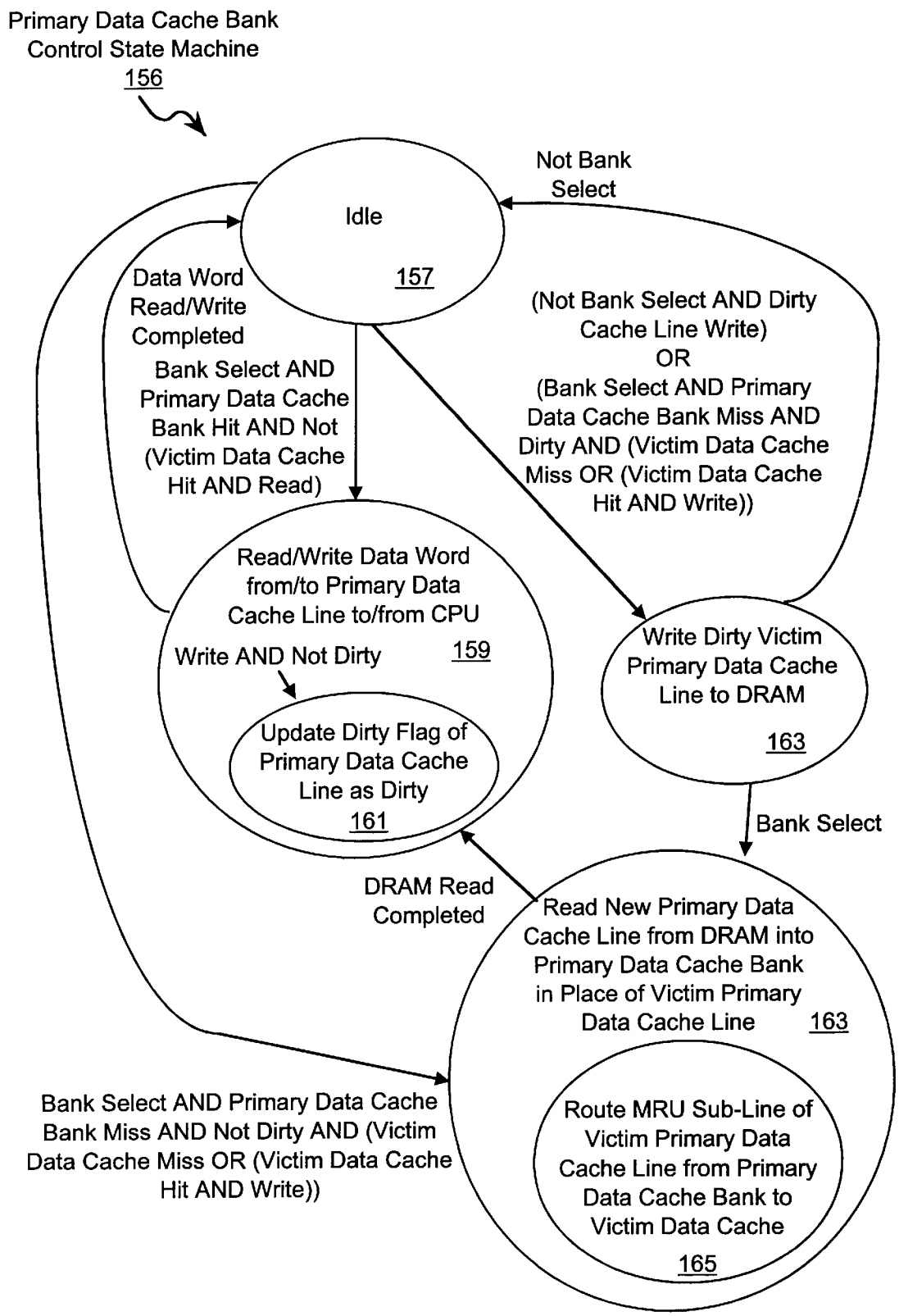
FIG. 6 is a state diagram of the states of the primary data cache bank logic of each primary data cache bank.

The operation of the primary data cache bank 120 of each memory block 104 is controlled by the primary data cache bank logic 150. As shown in FIG. 5, the primary data cache bank logic of each primary data cache bank includes a primary data cache bank control state machine 152, a primary data cache bank address/tag comparison circuit 154, and a primary data cache bank select circuit 156. FIG. 6 shows the states of operation of the primary data cache bank logic control state machine.

Figure 7:
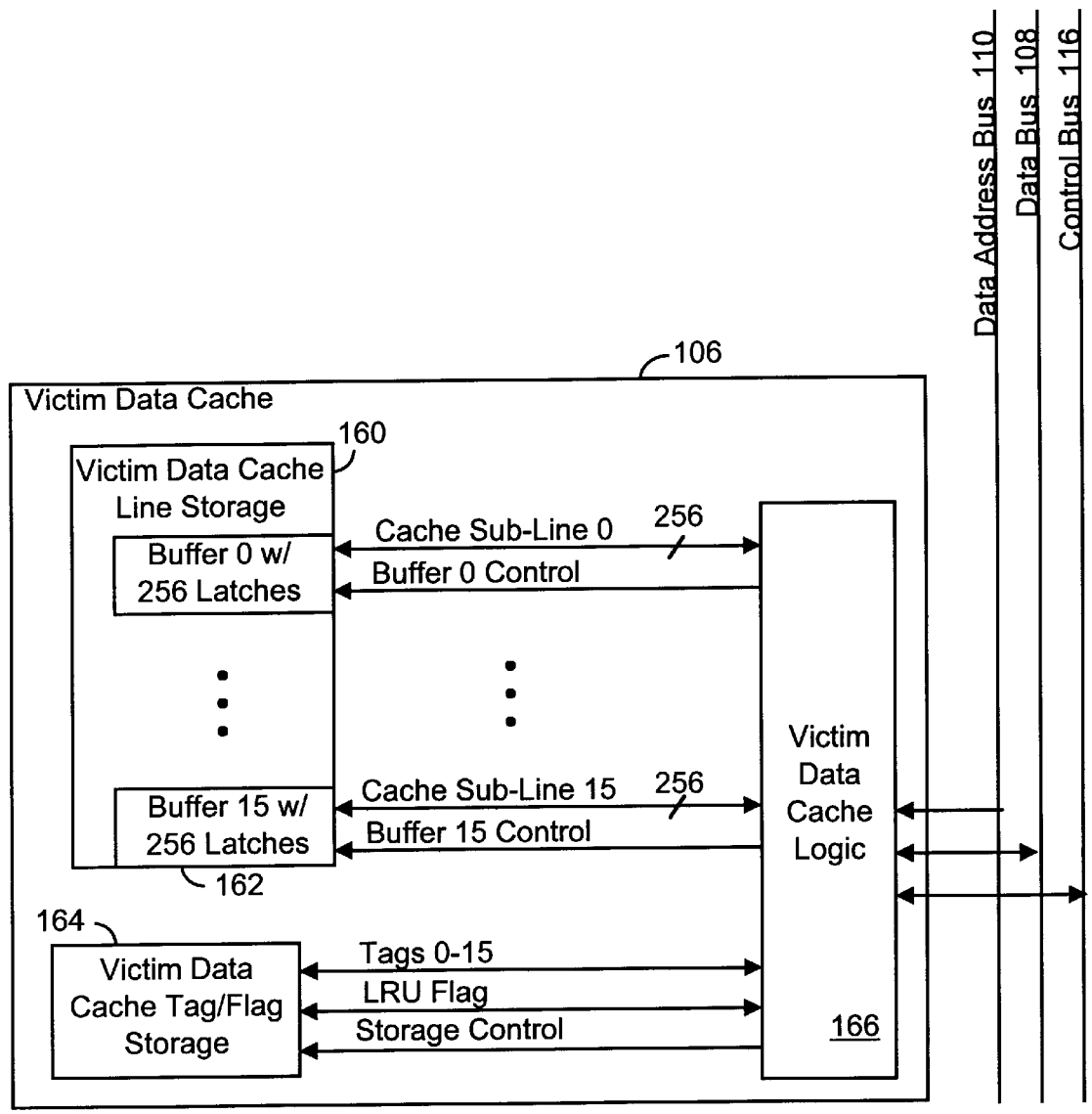
FIG. 7 is a block diagram of the victim cache of the P/M device.

Referring to FIG. 7, and as will be explained in greater detail later, the victim data cache is used to store victim data cache sub-lines (or sub-blocks) of primary data cache lines that were recently replaced (i.e., were replacement victims) with new primary data cache lines in the primary data cache banks 122. The victim data cache includes a victim data cache line storage 160 that comprises 16 buffers 162. Each buffer of the victim data cache line storage includes 256 latches that together store a victim data cache sub-line that is 256 bits or 32 bytes wide. Thus, in the exemplary embodiment, each victim data cache sub-line is 4 data words wide.

The victim data cache 106 also includes a victim data cache tag/flag storage 164. The victim data cache tag/flag storage stores a corresponding 22 bit tag for each of the 16 victim data cache sub-lines currently stored by the victim data cache line storage 160. Each tag identifies the corresponding victim data cache sub-line and indicates the memory location it normally occupies in the main memory. These tags are compared by the victim data cache logic 166 with the 19 address bits A24–A6 of each 25 bit data address A24–A0 that is issued. Additionally, the victim data cache tag/flag storage stores a flush flag that identifies which of the victim data cache sub-lines is to be flushed the next time a new victim data cache sub-line is written into the victim data cache.

Figure 8:
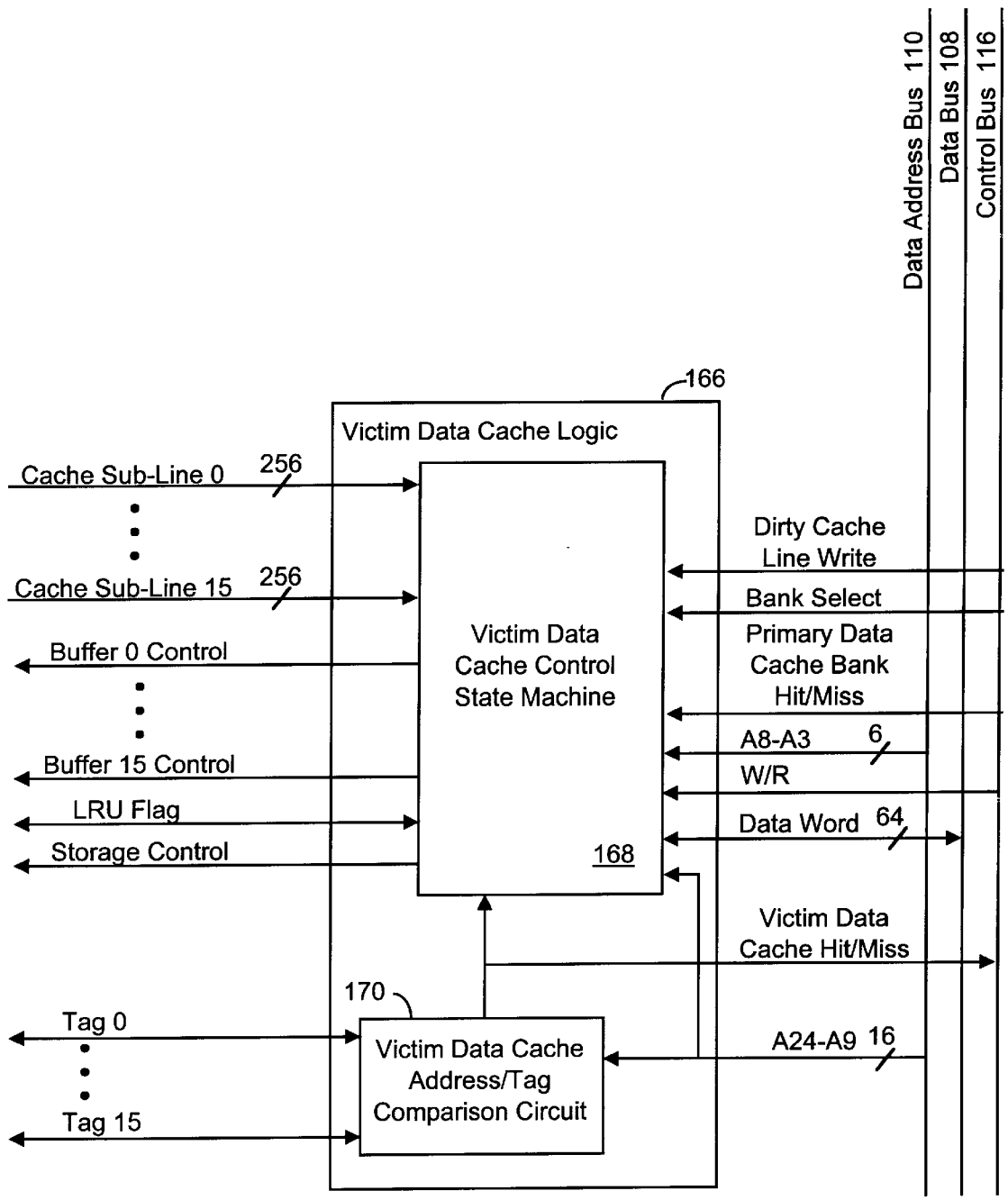
FIG. 8 is a block diagram of the victim cache logic of the victim cache.
Figure 9:
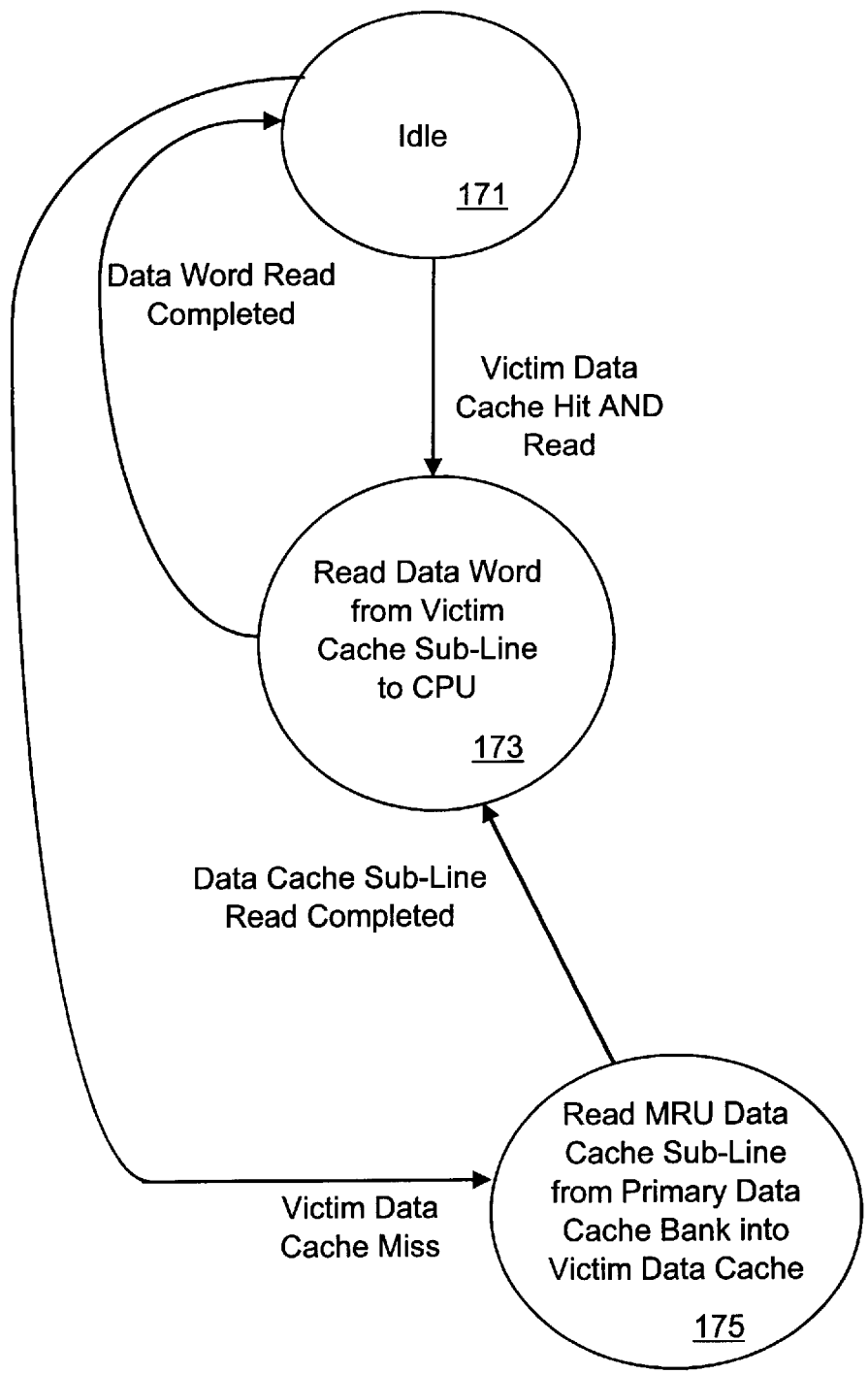
FIG. 9 is a state diagram of the states of the victim cache logic.

The operation of the victim data cache 106 is controlled by the victim data cache logic 166. As shown in FIG. 8, the victim data cache logic includes a victim data cache control state machine 168 and a victim data cache address/tag comparison circuit 170. FIG. 9 shows the states of operation of the victim data cache logic control state machine.

Referring to FIG. 1, the CPU issues a 25 bit data address A24–A0 on the data address bus 110 when it wishes to read or write a data word from or to the main memory. The issued data address specifies the memory location in the address space of the main memory at which the data word is to be read or written. The CPU also issues a write/read (W/R) signal on the control bus 116 that indicates whether a read or write is occurring.

Turning now to FIGS. 7–9, each time a data address is issued by the CPU 102, the victim data cache address/tag comparison circuit 170 of the victim data cache 106 compares the tags currently stored in the victim data cache tag/flag storage 164 with the 19 address bits A24–A6 of the issued data address on the data address bus 110. If there is a match, then the victim data cache address/tag comparison circuit issues a victim data cache hit/miss signal that indicates that a victim data cache hit has occurred. This means that the memory location addressed by the issued data address is currently accessible at one of the victim data cache sub-lines stored in the victim data cache line storage 160. The victim data cache hit/miss signal also identifies the victim data cache sub-line in which the victim data cache hit occurred. But, if there is no match, then this means that the memory location addressed by the issued data address is not currently accessible at one of the victim data cache sub-lines stored in the victim data cache line storage and the victim data cache address/tag comparison circuit issues a victim data cache hit/miss signal that indicates that a victim data cache miss has occurred.

Unlike conventional victim data caches, the victim data cache 106 in the exemplary embodiment is not used to write back victim data cache sub-lines to the primary data cache banks 122. In other words, the victim data cache cannot write a data word into a victim data cache sub-line and then write back the dirty victim data cache sub-line to the corresponding primary data cache bank. This, is due to the timing and architectural constraints discussed later.

The victim data cache control state machine 168 receives the W/R signal from the CPU 102 on the control bus, the victim data cache hit/miss signal from the victim data cache address/tag comparison circuit 170, the 6 address bits A8–A3 of the issued data address on the data address bus 110, and the victim data cache sub-lines currently stored by the victim data cache line storage 160. When the W/R signal indicates that a read is occurring and the victim data cache hit/miss signal indicates that a victim data cache hit has occurred, then the victim data cache control state machine leaves its idle state (state 171 of FIG. 9) and decodes the received 6 address bits to determine the accessible memory location of the data word in the identified victim data cache sub-line at which the data word is to be read. The victim data cache control state machine then reads the data word from the identified victim data cache sub-line and provides it to the CPU 102 (state 173 of FIG. 9). This is done by routing the data word in the identified victim data cache sub-line onto the data bus 108 so that it is received by the CPU. In the exemplary embodiment, only a single cycle is required to access the victim data cache and read a victim data cache sub-line to the CPU.

However, when the W/R signal received from the CPU 102 indicates that a write is occurring or when a victim data cache hit/miss signal is issued indicating that a victim data cache miss has occurred, then the victim data cache control state machine 168 remains in an idle state (state 171 of FIG. 9). In this case, the data word that is to be written or read at the memory location specified by the issued data address must be written to or read from the primary data cache bank 122 in the memory block 104 with the corresponding main memory bank 118 that has the memory location specified by the issued data address.

The CPU 102 also receives the victim data cache hit/miss signal. Thus, when the CPU receives a victim data cache hit/miss signal indicating that a victim data cache hit has occurred during a read, it waits for the data word at the memory location specified by the issued data address to be provided to it by the victim data cache 106 via the data bus 108. However, when the CPU receives a victim data cache hit/miss signal that indicates that a victim data cache hit has occurred during a write or receives a victim data cache hit signal indicating that a victim data cache miss has occurred, it determines whether a primary data cache bank hit or miss signal has been issued by the primary data cache bank 122 corresponding to the main memory bank 118 with the memory location specified by the issued data address.

Referring to FIGS. 2, 5, and 6, in each primary data cache bank 122, the primary data cache bank select circuit 156 of the primary data cache bank logic 150 operates in the same way as the instruction cache bank select circuit 140 of the instruction cache bank logic 134 of each instruction cache bank 120. Thus, it receives the 4 most significant bits A24–A21 of the issued data address from the data address bus 110. In response, it decodes these 4 address bits to determine whether they identify the corresponding main memory bank 118. If they do identify the corresponding main memory bank, then the primary data cache bank select circuit sends a bank select signal to the primary data cache bank control state machine 152 and the primary data cache bank address/tag comparison circuit 154 indicating that the corresponding main memory bank has been selected. Otherwise, the bank select signal indicates that the corresponding main memory bank has not been selected and the primary data cache bank control state machine remains in an idle state (state 157 of FIG. 6).

In each primary data cache bank 122, when the bank select signal indicates that the corresponding main memory bank 118 has been selected, then the primary data cache bank address/tag comparison circuit 154 compares the primary data cache line tags currently stored in the primary data cache bank tag/flag storage 148 with the 12 address bits A20–A9 of the issued data address on the data address bus 110. These 12 address bits identify the memory location of the row in the corresponding main memory bank where the data word is currently stored for a read or is to be stored for a write.

If there is a match, then the primary data cache bank address/tag comparison circuit 154 issues a primary data cache bank hit/miss signal that together with the bank select signal indicates that a primary data cache bank hit has occurred. This means that the memory location addressed by the issued data address is currently accessible at one of the primary data cache lines stored in the primary data cache bank line storage 144. The primary data cache bank hit/miss signal also identifies this primary data cache line. On the other hand, if there is no match, then this means that the memory location addressed by the issued data address is not currently accessible at one of the primary data cache lines stored in the primary data cache bank line storage 144 and the primary data cache bank address/tag comparison circuit issues a primary data cache bank hit/miss signal that together with the bank select signal indicates that a primary data cache bank miss has occurred.

In each primary data cache bank 122, the primary data cache bank hit/miss signal is provided to the primary data cache bank control state machine 152. The victim data cache hit/miss signal from the victim data cache 106 is also provided to the primary data cache bank control state machine on the control bus 116 along with the W/R signal from the CPU.

As indicated earlier, when a victim data cache hit/miss signal indicating a victim data cache hit is issued during a read, then the victim data cache 106 provides the CPU with the data word at the memory location addressed by the issued data address. Thus, in each primary data cache bank 122, when the primary data cache bank control state machine 152 receives a victim data cache hit/miss signal indicating a victim data cache hit and a W/R signal indicating a read, then it remains in an idle state (state 157 of FIG. 6). This is true even when the primary data cache bank hit/miss signal it receives from the primary data cache bank address/tag comparison circuit 154 indicates that a primary data cache bank hit has occurred.

However, when a victim data cache hit/miss signal indicating a victim data cache hit is issued during a write or when a victim data cache hit/miss signal indicating a victim data cache miss is issued, then the victim data cache 106 is not used to access the location addressed by the issued data address. Thus, in each primary data cache bank 122, in either of the two conditions just described, the primary data cache bank control state machine 152 controls the reading and writing of a data word at the memory location specified by the issued data address in either case where the primary data cache bank hit/miss and bank select signals indicate a primary data cache bank hit or miss has occurred.

The primary data cache bank hit/miss and bank select signals from each primary data cache bank 122 are also provided to the CPU 102 via the control bus 116. When these signals from a primary data cache bank indicate that a primary data cache bank hit has occurred and either a victim data cache hit/miss signal that indicates that a victim data cache hit has occurred is received during a write or a victim data cache hit/miss signal indicating that a victim data cache miss has occurred is received, the CPU knows that the data word to be read or written can be done so directly from or to the primary data cache bank 122. The CPU then does not stall the instruction pipeline in order to wait for a primary data cache line with an accessible memory location specified by the issued data address is read from the main memory bank into the primary data cache bank, as would have been the case had a primary data cache bank miss occurred.

In each primary data cache bank 122, in addition to the primary data cache bank hit/miss, bank select, and W/R signals, the primary data cache bank control state machine 152 receives from the data address bus 110 the 6 address bits A8–A3 of the issued data address and the primary data cache lines currently stored by the primary data cache bank line storage 144. When the primary data cache bank hit/miss and bank select signals indicate that a primary data cache bank hit has occurred, the primary data cache bank control state machine 152 decodes the received 6 address bits to determine the accessible memory location specified by the issued data address in the primary data cache line identified by the primary data cache bank hit/miss signal as being the primary data cache line in which the primary data cache bank hit occurred. If the W/R signal indicates a read, then the primary data cache bank control state machine reads the data word from the determined location in the identified data cache line and provides it to the CPU 102 (state 159 of FIG. 6). This is done by routing the data word in the identified data cache line onto the data bus 108 so that it is received by the CPU. In the exemplary embodiment, only a single cycle is required to access the primary data cache bank and read the data word to the CPU. Once the read is completed, the primary data cache bank control state machine returns to an idle state (state 157 of FIG. 6).

But, if the W/R signal indicates a write, the primary data cache bank control state machine 152 writes a data word from the CPU to the determined location in the identified data cache line. This is done by routing the data word from the data bus 108 to the buffer 146 in the primary data cache bank line storage 144 that stores the identified primary data cache line and issuing buffer control signals that cause the buffer to latch the data word (state 159 of FIG. 6). Then, if the corresponding dirty flag for the identified primary data cache line does not already indicate that the primary data cache line is dirty, then the primary data cache bank control state machine updates it to indicate that it is now dirty (sub-state 161 of FIG. 6). This is done by providing the updated dirty flag to the primary data cache bank tag/flag storage 148 and issuing storage control signals that cause the primary data cache bank tag/flag storage to store the updated dirty flag. Once the write is completed, the primary data cache bank control state machine returns to an idle state (state 157 of FIG. 6).

However, when the CPU receives primary data cache bank hit/miss and bank select signals from a primary data cache bank 122 that indicate that a primary data cache bank miss has occurred and either receives during a write a victim data cache hit/miss signal that indicates that a victim data cache hit has occurred or receives a victim data cache hit signal indicating that a victim data cache miss has occurred, it stalls while a new primary data cache line with the memory location specified by the issued data address is read from the corresponding main memory bank 118 into the primary data cache bank. This also requires writing to the main memory bank the victim primary data cache line being replaced by the new primary data cache line if the corresponding dirty flag for the victim primary data cache line indicates that it is dirty. In this case, the CPU will be additionally stalled.

In each primary data cache bank 122, the primary data cache bank control state machine 152 also receives from the primary data cache bank tag/flag storage 148 the dirty flags for the primary data cache lines stored by the primary data cache bank line storage 144 in order to determine whether they are dirty. As described earlier, each dirty flag is updated to indicate that the corresponding primary data cache line is dirty whenever a data word is written to the corresponding primary data cache line and the dirty flag does not yet indicate that the primary data cache line is dirty.

The primary data cache bank control state machine 152 of each primary data cache bank 122 also receives the LRU flag from the primary data cache bank tag/flag storage 148 of the primary data cache bank. As mentioned previously, the LRU flag identifies the primary data cache line that was least recently used. The LRU flag is updated by the primary data cache bank control state machine each time that a different primary data cache line is accessed for a read or a write. The updated LRU flag is then provided to the primary data cache bank tag/flag storage and stored in it with storage control signals issued by the primary data cache bank control state machine.

In each primary data cache bank 122, when the primary data cache bank control state machine 152 of the primary data cache bank receives primary data cache bank hit/miss and bank select signals indicating that a primary data cache bank miss has occurred and either receives a victim data cache hit/miss signal indicating that a victim data cache hit has occurred and a W/R signal indicating that a write is occurring or receives a victim data cache hit signal indicating that a victim data cache miss has occurred, then this means that a new primary data cache line with the memory location specified by the issued data address must be read from the corresponding main memory bank 118. However, prior to doing so, the primary data cache bank control state machine determines from the LRU flag which of the currently stored primary data cache lines is the least recently used one and therefore will be the victim primary data cache line that will be replaced by the new primary data cache line.

However, in each primary data cache bank 122, prior to replacing the victim data cache line with a new data cache line, the primary data cache bank control state machine 152 writes back to the corresponding main memory bank 118 the victim primary data cache line if it is dirty (state 163 of FIG. 6). The primary data cache bank control state machine does so by first determining from the corresponding dirty flag provided by the primary data cache bank tag/flag storage 148 whether the victim primary data cache line is dirty. If it is dirty, then the primary data cache bank control state machine issues on the control bus 116 a dirty cache line write signal indicating that it needs to write back a dirty victim primary data cache line. This signal is received by the CPU 102 and in response the CPU stalls to allow the dirty victim primary data cache line to be written back to the corresponding main memory bank and the new primary data cache line to be read into the primary data cache bank.

The primary data cache bank control state machine 152 writes back the dirty victim primary data cache line by issuing to the corresponding main memory bank 118 a W/R control signal indicating that a write is to occur and the 12 address bits A20–A9 received from the corresponding tag for the dirty victim primary data cache line provided by the primary data cache bank tag/flag storage 148. Moreover, the primary data cache bank control state machine issues buffer control signals to the buffer 146 that stores the dirty victim primary data cache line being written back so that the dirty victim primary data cache line is routed to the sense amplifiers 126 of the corresponding main memory bank. In response to the 12 address bits, the row decoder 124 locates the row of the corresponding main memory bank that is identified by the 12 address bits. And, in response to the W/R control signal, the sense amplifiers 126 write the provided dirty victim primary data cache line into the identified row of the corresponding main memory bank. In the exemplary embodiment, 6 cycles are required to write back a dirty victim primary data cache line including 1 cycle to determine that a primary data cache bank miss occurred and to identify a dirty victim primary data cache line, 4 cycles of pre-charging the sense amplifiers and address bit decoding by the row decoder, and 1 cycle to write the dirty victim primary data cache line into the main memory bank.

Moreover, since the CPU is stalled while a dirty victim primary data cache line is being written back, the other primary data cache banks 122 each write back a dirty primary data cache line to the corresponding main memory bank 118 if it stores at least one dirty primary data cache line (state 163 of FIG. 6). In each of these other primary data cache banks, this is done when the dirty cache line write signal on the control bus 116 indicates that a dirty victim primary data cache line is being written back and the bank select signal indicates that the corresponding main memory bank has not been selected. This write back is controlled by the primary data cache bank control state machine 152 of each of these other primary data cache banks in a similar manner to that just described. However, if there is only one dirty primary data cache line stored by a primary data cache bank, then it is written back. But, if there are two dirty primary data cache lines, then the dirty primary data cache line identified by the LRU flag as being the LRU primary data cache line is the one that is written back. Once this write back is completed, then the primary data cache bank control state machine returns to an idle state (state 157 of FIG. 6).

In each primary data cache bank 122, once a dirty victim primary data cache line has been written back to the corresponding main memory bank 118 or when the corresponding dirty flag for the victim primary data cache line indicates that it is not dirty, then the primary data cache bank control state machine 152 reads the new primary data cache line with the location specified by the issued data address from the corresponding main memory bank 118 into the primary data cache bank (state 163 of FIG. 6). This is done by issuing to the corresponding main memory bank 118 a W/R control signal indicating that a write is to occur and the 12 address bits A20–A9 of the issued data address on the data address bus 110. In response to the 12 address bits, the row decoder 124 locates the row of the corresponding main memory bank that is identified by the 12 address bits. And, in response to the W/R control signal, the sense amplifiers 126 read out the new primary data cache line from the identified row of the corresponding main memory bank. Moreover, the primary data cache bank control state machine issues buffer control signals to the buffer 146 that stores the victim primary data cache line being replaced so that the new primary data cache line is latched by the buffer and replaces the victim primary data cache line. In the exemplary embodiment, this requires 5 cycles including 4 cycles of pre-charging the sense amplifiers and address bit decoding by the row decoder and 1 cycle to latch the new primary data cache line read out by the sense amplifiers into the main memory bank.

But, since accessing the main memory bank 118 to read out the new primary data cache line requires time for address bit decoding by the row decoder 124 and pre-charging of the sense amplifiers 126, this time can be efficiently used to write the most recently used (MRU) primary data cache sub-line of the victim primary data cache line to the victim data cache 106 prior to the new primary data cache line being latched in the buffer 146. In order to determine which primary data cache sub-line in a victim primary data cache line is the MRU sub-line, the primary data cache bank tag/flag storage 148 of each primary data cache bank 122 stores an MRU flag that identifies the MRU victim data cache sub-line in each primary data cache line stored by the primary data cache bank line storage 144. In addition, since the data bus 108 is not being used during this time, it can be efficiently used to write the MRU victim data cache sub-line to the victim data cache.

Therefore, during the time the sense amplifiers are being pre-charged and the row decoder is decoding address bits, the primary data cache bank control state machine 152 identifies the MRU victim data cache sub-line from the corresponding MRU flag received from the primary data cache bank tag/flag storage 148. It then routes the MRU victim data cache sub-line to the victim data cache 106 (sub-state 165 of FIG. 6) using the data bus 108. In the exemplary embodiment, this is done in four cycles since the data bus is 64 bits wide or 1 data word wide and the MRU victim data cache sub-line is 256 bits or 4 data words wide. Thus, the primary data cache bank control state machine routes a block of 64 bits or 1 data word of the MRU victim data cache sub-line each cycle onto the data bus during this time period.

Referring again to FIGS. 7–9, the victim data cache control state machine 168 receives from the control bus 116 the primary data cache bank hit/miss and bank select signals from each primary data cache bank 122 and also the dirty cache line write signal. When the primary data cache bank hit/miss and bank select signals from a primary data cache bank indicate that a primary data cache bank miss has occurred and the dirty cache line write signal indicates that a dirty victim primary data cache line is not being written back, then the victim data cache control state machine writes the MRU victim data cache sub-line provided by the primary data cache bank on the data bus 108 into victim data cache line storage 160 (state 175 of FIG. 9).

The victim data cache control state machine 168 does this by first determining which of the victim data cache sub-lines is to be replaced by the MRU victim data cache sub-line. In the case where there is a victim data cache hit during a read, the victim data cache control state machine 168 replaces the victim data cache subline in which the hit occurred with the MRU victim data cache sub-line. This is done because a primary data cache bank miss occurred in the primary data cache bank 122 that provides the MRU victim data cache sub-line and the primary data cache line that is being read in response from the corresponding main memory bank into the primary data cache bank includes the victim data cache sub-line being replaced. This is indicated by the fact that a victim data cache hit occurred in the victim data cache sub-line being replaced.

However, in the case where there was a victim data cache miss, the victim data cache control state machine 168 replaces the LRU victim data cache sub-line with the MRU victim data cache sub-line. The LRU victim data cache sub-line is identified by the LRU flag stored by the victim data cache tag/flag storage 164. The LRU flag is updated by the victim data cache control state machine each time that a victim data cache sub-line is accessed for a read. The updated LRU flag is then provided to the victim data cache tag/flag storage and stored in it with storage control signals issued by the victim data cache control state machine.

The victim data cache control state machine 168 stores the MRU victim data cache sub-line in the buffer 162 that currently stores the victim data cache sub-line being replaced. This is done by routing to the corresponding latches of the buffer the 64 bit blocks received on the data bus during the 4 cycles required to transfer the MRU victim data cache sub-line. At the same time, buffer control signals are issued to the corresponding latches during the 4 cycles so as to latch the 64 bit blocks in the buffer.

Turning again to FIGS. 2, 5, and 6, in each primary data cache bank 122, after a new primary data cache line has been read into the primary data cache bank and an MRU victim data cache sub-line has been read into the victim data cache 106, then a data word is read from or written to the new primary data cache line as described earlier (states 159 and 161 of FIG. 6).

Thus, from the foregoing, the 16 primary data cache banks 122 together form a two-way set-associative data cache that contains 16K bytes and the victim data cache 106 is a 16-way fully-associative victim data cache. Moreover, collectively, they form the data cache system of the P/M device 100. Since the primary data cache lines stored by each data cache bank are full-width and on-chip, the cache miss rate is greatly reduced over conventional data caches that store data cache lines that are less than full-width. As in the instruction cache formed by the instruction cache banks 120, this low cache miss rate is due to the benefit of prefetching the long data cache lines for accesses with high spatial locality. Moreover, this miss rate is even further reduced by the utilization of the on-chip victim data cache which absorbs accesses with poor spatial locality. Additionally, because of severe second order contention effects of the kind described earlier for off-chip main memory and on-chip instruction caches, conventional processors with off-chip main memory and on-chip data caches are unable to take advantage of the benefit of a full-width data cache line.

As those skilled in the art will recognize numerous alternative embodiments to the exemplary embodiment of FIGS. 1–9 exist. For example, the rows in the main memory banks 118 and the buffers 130 and 146 in the data and instruction cache bank line storages may have a different width than the exemplary width of 4096 bits, but would still preferably have equal size widths. And, each instruction cache bank and each data cache bank could include one or more buffers. Furthermore, a victim data cache, like the victim data cache used for the primary data cache banks, could be used for the instruction cache banks. Finally, rather than using the LRU policy for determining victim data cache lines and the MRU policy for determining a victim data cache sub-line to be written to the victim data cache, other policies could be used instead.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. An integrated processor/memory device comprising:
   a CPU to issue an address;
   a cache bank;
   a main memory bank with rows of memory cells and sense amplifiers, the main memory bank being configured to simultaneously read out with the sense amplifiers all bits stored in the memory cells of an addressed row of the rows as a new cache line when a cache miss in the cache bank occurs for the issued address, the issued address specifying the addressed row; and
   the cache bank comprising one or more buffers with each of the buffers comprising latches, the cache bank being configured to simultaneously store in the latches of a selected buffer of the one or more buffers all of the bits of the new cache line when the cache miss occurs;
   wherein the CPU, the main memory bank, and the cache bank are all integrated together on a chip; and
   further wherein the number of the memory cells in each of the rows, the number of the sense amplifiers, the number of the bits of the new cache line, and the number of latches of each of the one or more buffers are all the same number.

2. The integrated processor/memory device of claim 1 wherein:
   the cache bank is further configured to, when a cache miss occurs for the issued address and the latches of the selected buffer store bits of a dirty cache line, simultaneously route all of the bits of the dirty cache line to the main memory bank prior to storing the bits of the new cache line;
   the main memory bank is further configured to, when a cache miss occurs for the issued address and the latches of the selected buffer store bits of a dirty cache line, simultaneously write with the sense amplifiers all of the bits of the dirty cache line into the memory cells of a tagged row of the rows prior to reading out the bits of the new cache line; and
   the number of bits of the dirty cache line is the same number as well.

3. The integrated processor/memory device of claim 2 wherein the same number is 4096.

4. An integrated processor/memory device comprising:
   a CPU to issue an address;
   a cache comprising cache banks,
   a main memory comprising main memory banks where there is a corresponding one of the cache banks for each of the main memory banks, each of the main memory banks comprising rows of memory cells and sense amplifiers, each of the main memory banks being configured to simultaneously read out with the main memory bank's sense amplifiers all bits stored in the memory cells of an addressed row of the main memory bank's rows as a new cache line when a cache miss in the corresponding cache bank occurs for the issued address, the issued address specifying the addressed row; and
   each of the cache banks comprises one or more buffers with each of the buffers comprising latches, each of the cache banks being configured to simultaneously store in the latches of a selected buffer of the cache bank's one or more buffers all of the bits of the new cache line from the corresponding main memory bank when a cache miss in the cache bank occurs for the issued address;
   wherein the CPU, the main memory, and the cache are all integrated together on a single chip; and
   further wherein the number of the memory cells in each of the rows of each of the main memory banks, the number of the sense amplifiers of each of the main memory banks, the number of the bits of a new cache line from each of the main memory banks, and the number of latches in each of the one or more buffers of each of the cache banks are all the same number.

5. The integrated processor/memory device of claim 4 wherein:
   each of the cache banks is further configured to, when a cache miss in the cache bank occurs for the issued address and the cache bank's latches store bits of a victim cache line that is dirty, simultaneously route all of the bits of the victim cache line to the corresponding main memory bank prior to storing the bits of the new cache line;
   each of the main memory banks being further configured to, when a cache miss in the corresponding cache bank occurs for the issued address and the corresponding cache bank's latches store bits of a victim cache line that is dirty, simultaneously write with the main memory bank's sense amplifiers the bits of the victim cache line from the corresponding cache bank into the memory cells of a tagged row of the memory bank's rows prior to reading out the bits of the new cache line; and
   the number of bits of the victim cache line is the same number as well.

6. The integrated processor/memory device of claim 5 wherein:
  each of the cache banks is further configured to, when a cache miss in another one of the cache banks occurs for the issued address and the cache bank's latches store bits of a dirty cache line, simultaneously route all of the bits of the dirty cache line to the corresponding main memory bank;
  each of the main memory banks being further configured to, when a cache miss in one of the cache banks that is not the corresponding cache bank occurs for the issued address and the corresponding cache bank's latches store bits of a dirty cache line, simultaneously write with the main memory bank's sense amplifiers the bits of the dirty cache line from the corresponding cache bank into the memory cells of a tagged row of the memory bank's rows;
  the number of bits of the dirty cache line is the same number as well.

7. The integrated processor/memory device of claim 5 wherein the same number is 4096.

8. A method of operating an integrated processor/memory device comprising a CPU, a main memory bank, and a cache bank integrated together on a single chip, the method comprising the steps of:
  issuing an address with the CPU;
  simultaneously reading out with sense amplifiers of the main memory bank all bits stored in memory cells of an addressed row of the main memory bank's rows as a new cache line when a cache miss in the cache bank occurs for the issued address, the issued address specifying the addressed row;
  simultaneously storing in latches of a selected buffer of the cache bank's one or more buffers all of the bits of the new cache line when the cache miss occurs;
  wherein the number of the memory cells in each of the main memory bank's rows, the number of the sense amplifiers, the number of the bits of the new cache line, the number of bits of the dirty cache line, and the number of latches of each of the cache bank's one or more buffers are all the same number.

9. The method of claim 8 wherein the same number is 4096.

10. The method of claim 8 further comprising the steps of:
  simultaneously routing all of the bits of the dirty cache line to the main memory bank prior to the storing step when the cache miss occurs and the latches of the selected buffer store bits of a dirty cache line; and
  simultaneously writing with the sense amplifiers all of the bits of the dirty cache line into the memory cells of a tagged row of the main memory bank prior to the reading out step when the cache miss occurs and the latches of the selected buffer store the bits of the dirty cache line;
  wherein the number of bits of the dirty cache line is the same number as well.

11. A method of operating an integrated processor/memory device comprising a CPU, a main memory, and a cache integrated together on a single chip, the main memory comprising main memory banks and the cache comprising cache banks so that there is a corresponding one of the cache banks for each of the memory banks, the method comprising the steps of:
  issuing an address with the CPU;
  in each of the main memory banks, simultaneously reading out with sense amplifiers of the main memory bank all bits stored in memory cells of an addressed row of the main memory bank as a new cache line when a cache miss in the corresponding cache bank occurs for the issued address, the issued address specifying the addressed row; and
  in each of the cache banks, simultaneously storing in latches of a selected buffer of the cache bank's one or more buffers all of the bits of the new cache line when a cache miss in the cache bank occurs for the issued address;
  wherein the number of the memory cells in each of the rows of each of the main memory banks, the number of the sense amplifiers of each of the main memory banks, the number of the bits of the new cache line, the number of bits of the dirty cache line, and the number of latches of each of the one or more buffers of each of the cache banks are all the same number.

12. The device of claim 11 wherein the same number is 4096.

13. The method of claim 11 further comprising the steps of:
  in each of the cache banks, when a cache miss in the cache bank occurs for the issued address and the cache bank's latches store bits of a victim cache line that is dirty, simultaneously routing all of the bits of the victim cache line to the corresponding main memory bank prior to storing the bits of the new cache line;
  in each of the main memory banks, when a cache miss in the corresponding cache bank occurs for the issued address and the corresponding cache bank's latches store bits of a victim cache line that is dirty simultaneously writing with the main memory bank's sense amplifiers the bits of the victim cache line from the corresponding cache bank into the memory cells of a tagged row of the memory bank's rows prior to reading out the bits of the new cache line; and
  the number of bits of the victim cache line is the same number as well.

14. The method of claim 13 further comprising the steps of:
  in each of the cache banks, when a cache miss in another one of the cache banks occurs for the issued address and the cache bank's latches store bits of a dirty cache line, simultaneously routing all of the bits of the dirty cache line to the corresponding main memory bank;
  in each of the main memory banks, when a cache miss in one of the cache banks that is not the corresponding cache bank occurs for the issued address and the corresponding cache bank's latches store bits of a dirty cache line, simultaneously writing with the main memory bank's sense amplifiers the bits of the dirty cache line from the corresponding cache bank into the memory cells of a tagged row of the memory bank's rows;
  the number of bits of the dirty cache line is the same number as well.

* * * * *

UNITED STATES PATENT AND TRADEMARK OFFICE
CERTIFICATE OF CORRECTION

PATENT NO. : 6,199,142 B1　　　　　　　　　　　　　　　　　　　　　　　Page 1 of 1
DATED : March 6, 2001
INVENTOR(S) : Saulsbury et al.

It is certified that error appears in the above-identified patent and that said Letters Patent is hereby corrected as shown below:

Column 15,
Line 64, delete "a" and insert -- the --;
Line 65, delete "for the issued address".

Column 17, Claim 9,
line 43, delete "8" and insert -- 10 --.

Column 18, Claim 12,
Line 23, delete "11" and insert -- 13 --.

Signed and Sealed this

Twenty-first Day of August, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO.   : 6,199,142 B1
DATED        : March 6, 2001
INVENTOR(S)  : Saulsbury et al.

It is certified that error appears in the above-identified patent and that said Letters Patent is hereby corrected as shown below:

Column 15,
Line 64, delete "a" and insert -- the --;
Line 65, delete "for the issued address".

Column 17, claim 9,
Line 43, delete "8" and insert -- 10 --.

Column 18, claim 12,
Line 23, delete "11" and insert -- 13 --.

Signed and Sealed this

Fifth Day of March, 2002

Attest:

JAMES E. ROGAN
*Attesting Officer*          *Director of the United States Patent and Trademark Office*